Nov. 20, 1962 R. E. GEGOUX ETAL 3,065,030
KNOCK-DOWN BUS SEAT
Filed Aug. 10, 1960 2 Sheets-Sheet 1

INVENTOR.
Roland E. Gegoux,
BY & Hans Schjölin

L. P. Barnard
ATTORNEY

INVENTOR.
Roland E. Gegoux,
& Hans Schjölin
BY
R. P. Barnard
ATTORNEY

United States Patent Office 3,065,030
Patented Nov. 20, 1962

3,065,030
KNOCK-DOWN BUS SEAT
Roland E. Gegoux, Pontiac, and Hans O. Schjolin, Birmingham, Mich., assignors to General Motors Corporation, Detroit, Mich., a corporation of Delaware
Filed Aug. 10, 1960, Ser. No. 48,697
1 Claim. (Cl. 297—445)

This invention relates to seat structures and more particularly to seats or chairs that are specially adapted for installation in motor buses of the inter-city transit type.

An object of this invention is to provide a chair structure for installation in bus type vehicles which is sturdy in construction, light in weight and economical in manufacture. Another object is to provide a vehicle chair having the seat cushion and seat back formed of molded plastic and integrated with chair supporting apparatus for quick assembly. Still another object of this invention is to provide a seat or chair which may be readily and conveniently constructed and assembled. A further object of this invention is to provide a bus seat cushion which is spring latched in assembled position.

Other objects and advantages of the present invention will be apparent by reference to the following detailed description of an illustrative embodiment of the invention as shown on the accompanying drawing wherein.

Figure 1:
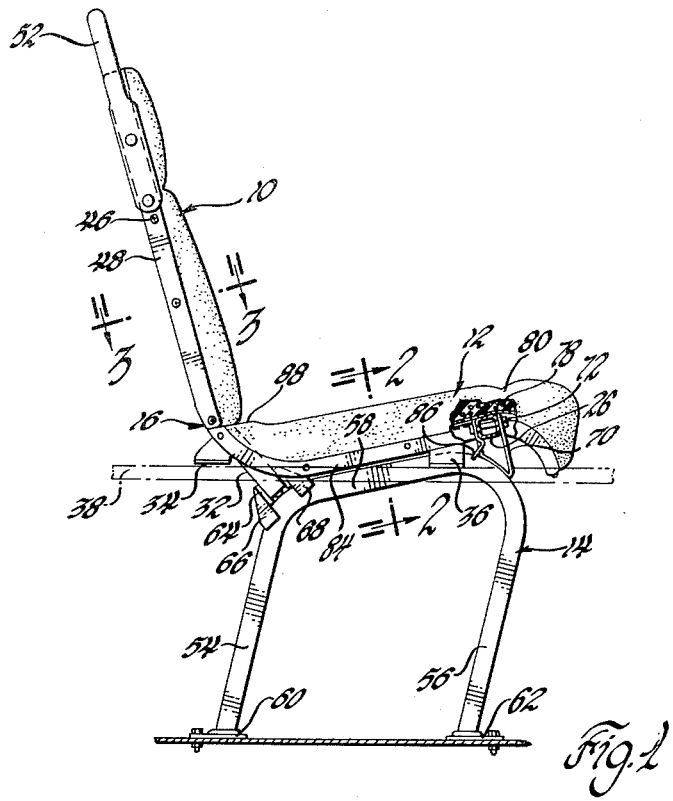
FIGURE 1 is a side elevational view of the illustrated embodiment.
Figure 2:
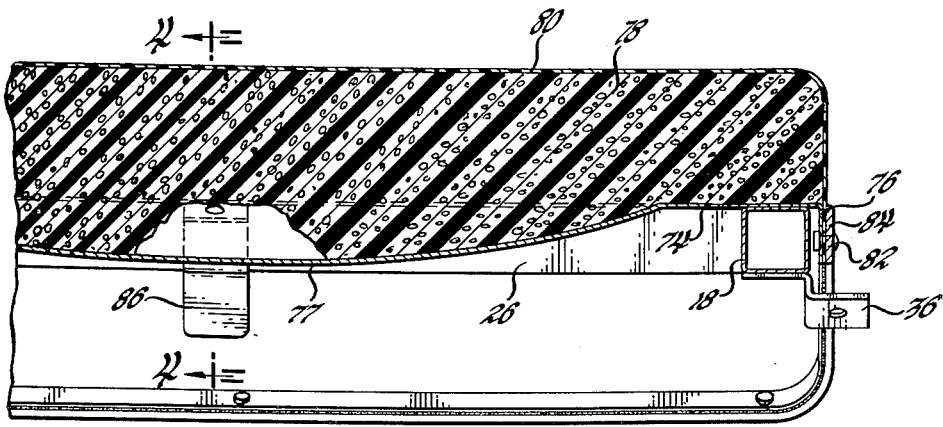
FIGURE 2 is a sectional view taken along the line 2—2 in FIGURE 1.
Figure 3:
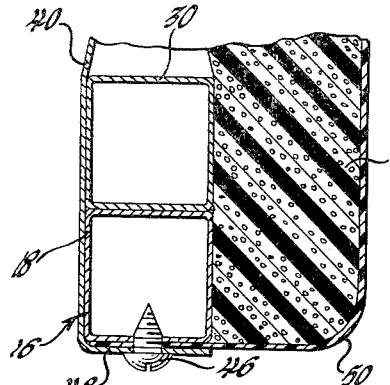
FIGURE 3 is a sectional view taken along the line 3—3 in FIGURE 1.
Figure 5:
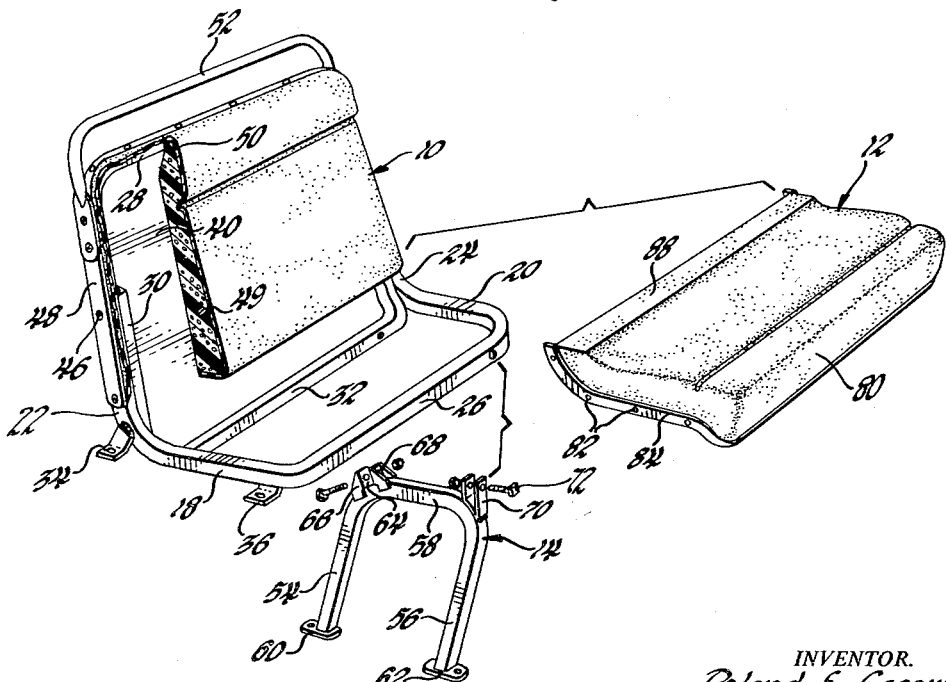
FIGURE 5 is an exploded perspective view of the embodiment shown in FIGURE 1.

Referring now to FIGURES 1 and 5, a seat comprising three subassemblies facilitating rapid assembly and economical warehouse storage is provided. The subassemblies consist of a seat back cushion and frame assembly 10, a seat cushion assembly 12 and a support leg assembly 14.

A cushion support frame is made from tubular metal having a rectangular cross section and has a substantially L-shaped configuration. The frame comprises substantially horizontal forwardly extending seat cushion supporting frame members 18, 20 and rearwardly upwardly extending seat back supporting frame members 22, 24. A lower cross support frame member 26 connects the forward extremities of the seat cushion supporting frame members 18, 20 and an upper cross support frame member 28 extends between the upward extremities of the seat back supporting frame members 22, 24. In addition, an intermediate cross brace 30 is fastened to the inner side surfaces of the seat back supporting frame members 22, 24 and is provided with a central portion 32 that extends forwardly downwardly below the seat cushion supporting frame members 18, 20. Spaced support flanges 34, 36 are welded or otherwise suitably secured to the cushion frame along one side thereof, and are provided with suitable fastening means (not shown) to secure the cushion frame to an adjacent side wall 38 of the motor vehicle in which the seat is to be placed. A cushion assembly comprising a pan 40 and a seat back cushion are fixedly secured to the seat back supporting frame members 22, 24 and the upper cross support frame member 28 by a plurality of screw members 46 extending through forwardly bent flange portions 48 of the pan 40. The pan extends downwardly the full length of the seat back cushion and terminates in approximate alignment with the forwardly extending frame members 18, 20 to provide a continuous shield to completely protect the rear surfaces of the cushions from wear and tear. The seat back cushion consists of a foamed plastic interior 49 and a wear resistant plastic cover 50. An assist bar 52 is suitably secured to the outer side surfaces of the seat back pan flange portions 48 and the supporting members 22, 24 and is upwardly outwardly spaced from the upper cross support frame member 28.

A leg support 14 is provided for the cushion frame 10 and comprises an inverted U-shaped tubular member having spaced upwardly forwardly extending leg portions 54, 56 and a central leg connecting portion 58. Flange members 60, 62 are provided to secure the leg portion to the vehicle floor. A rearwardly upwardly opening transverse cross brace accommodating groove 64 is provided on the rearward end of the leg connecting portion 58 by a pair of spaced bracket members 66, 68 having suitable fastening means, such as aligned bolt holes, provided thereon. A rearwardly upwardly opening lower cross support accommodating channel is formed on the forward end of the leg connecting portion 58 by U-shaped bracket 70 that is welded or otherwise suitably secured to the leg connecting portion 58. Suitable fastening means, such as aligned bolt holes, are associated with the bracket 70 to secure the lower cross support frame member 26 therein by bolts 72 or other fastening devices.

Figure 4:
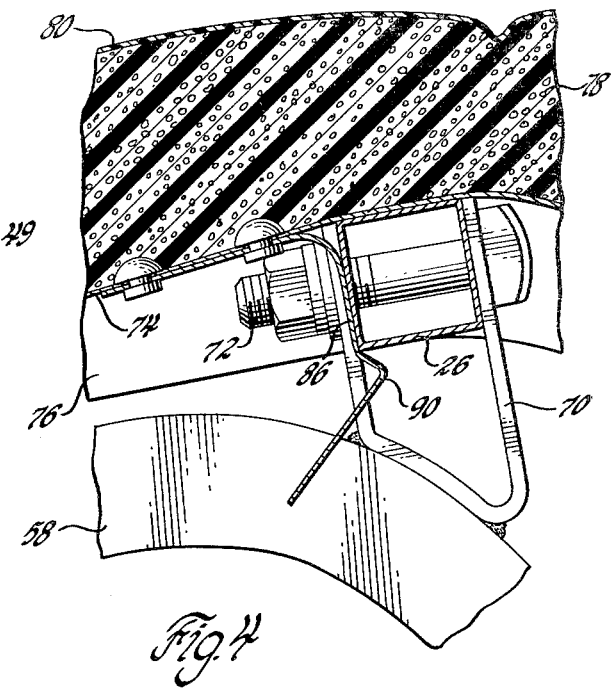
FIGURE 4 is a sectional view taken along the line 4—4 in FIGURE 2.

The seat cushion assembly 12 comprises a pan 74 having a downwardly bent peripheral flange 76 extending around the side and front surfaces thereof. The bottom of the pan is contoured to form seat pockets 77. A seat cushion is supported by the seat pan and comprises a foam plastic interior 78 and a wear resistant plastic cover 80 which is secured to the peripheral flange 76 by rivets 82 or other suitable fastening means. The plastic cover is sandwiched between a molding strip 84 and the peripheral flange 76. A pair of spaced spring clips 86 are riveted or otherwise fastened to the bottom surface of the seat cushion pan 74 and are spaced for seat cushion retaining engagement with the lower cross support frame member 26 in the assembled position as shown in FIGURE 4. The rear surface of the seat cushion is provided with flattened portion 88 contoured and positioned for abutting engagement with the lower end of the seat back cushion in the assembled position.

To assemble the apparatus as shown in FIGURE 5, the leg portions 54, 56 of the leg support are fastened to the vehicle floor by the flange members 60, 62. Then the cushion frame 10, including the assembled seat back, is mounted on the leg portions by engagement of the lower extremity 32 of the intermediate cross brace 30 within the upwardly rearwardly opening channel 64 formed by the bracket members 66, 68 and the lower cross support member 26 is engaged within the upwardly rearwardly opening channel formed by the U-shaped bracket 70. The support flanges 34, 36 are fastened on a support rail 38 formed on the adjacent vehicle wall. The cushion frame 10 is secured in assembled position by suitable fastening means associated with the support flanges 34, 36, the bracket members 66, 68 and the U-shaped bracket 70. At this time the seat cushion assembly is positioned on the forwardly extending seat cushion supporting frame members 18, 20 by coaction of the downwardly bent peripheral flange 76 therewith. The flattened portion 88 of the seat cushion is positioned in abutting relationship underneath the lower end of the seat back cushion and the seat is forced downwardly against the bias of the spring clips 86 until the detent portion 90 of the spring clips are positioned below the lower surface of the lower cross support frame member 26. Thus the seat cushion is retained in assembled position by coaction of spring clips 86 with the lower cross support frame member 26, the abutting relationship between the flattened portion 88 of the seat cushion and the lower end of the seat back, and the overlap of the peripheral flange 76 with the forwardly extending seat cushion supporting frame members 18, 20. The parts are rigidly secured in the assembled position to effectively eliminate any rattles or other noise which might occur due to relative movement of the parts. Additionally the assembled chair seat and chair back provide a contoured curved surface generally conforming to the seat and back contour of the seated vehicle occupant. If desired, the chair many be readily disassembled and the subassemblies may be stored in a minimum of space.

It is comprehended that certain details of the construction illustrated may be altered or omitted without departing from the spirit of the invention as defined by the appended claim.

We claim:

In a chair structure of the class described a seat support portion comprising parallel forwardly extending frame members, a lower cross support interconnecting the forward extremities of said frame members, rearward upwardly extending seat back supports connected to the rearward extremities of said frame members, the upward extremities of said seat back supports being interconnected by an upper cross support, a support brace fixedly secured to said seat back support and extending downwardly below said frame members, a seat back fixedly supported between said seat back supports, the lower end of said seat back terminating above said frame members, vehicle wall engaging support means associated with one side of said frame members, a floor engaging support frame comprising upwardly extending leg portions and a leg connecting central portion, a brace receiving bracket fixed on the rearward portion of said central portion, an upwardly opening channel formed by said bracket to slidably receive said support brace, means to secure said brace in said channel, a cross support receiving bracket fixed on the forward portion of said central portion, an upwardly opening cross support channel formed by said bracket to slidably receive said cross support, means associated with each of said channels to secure said cross support in said seat, a seat pan, a seat secured to said seat pan, means to secure said seat and said seat pan to said seat support portion comprising the abutting engagement of the rearward end of said seat and said seat pan extending below said seat back when in assembled position to secure the rearward end of said seat and said seat pan from upward movement, forming the front and side edges of said seat pan in a downwardly bent flange for close fitting engagement with said frame members to secure said seat and said seat pan from endwise and rearward movement, and spring clip means secured to said seat pan and retainingly engaged with said cross support to secure the front of said seat pan and said seat from upward and forward movement.

References Cited in the file of this patent

UNITED STATES PATENTS

| | | |
|---|---|---|
| 1,232,931 | Kilburn | July 10, 1917 |
| 2,300,116 | Goldberg | Oct. 27, 1942 |
| 2,355,762 | Van Derveer | Aug. 15, 1944 |
| 2,450,093 | Richardson | Sept. 28, 1948 |
| 2,542,931 | Lightfoot | Feb. 20, 1951 |

FOREIGN PATENTS

| | | |
|---|---|---|
| 467,205 | Great Britain | June 14, 1937 |
| 803,848 | Great Britain | Nov. 5, 1958 |